United States Patent
Sugiyama et al.

(10) Patent No.: US 10,444,729 B2
(45) Date of Patent: Oct. 15, 2019

(54) MONITORING DEVICE, MACHINE TOOL, AND MONITORING SYSTEM

(71) Applicant: FANUC CORPORATION, Yamanashi (JP)

(72) Inventors: Kazuyuki Sugiyama, Yamanashi (JP); Junichi Tezuka, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 15/887,028

(22) Filed: Feb. 2, 2018

(65) Prior Publication Data

US 2018/0224827 A1 Aug. 9, 2018

(30) Foreign Application Priority Data

Feb. 6, 2017 (JP) ................................. 2017-019365

(51) Int. Cl.
*G05B 19/406* (2006.01)
*G05B 19/418* (2006.01)
*G08B 21/18* (2006.01)

(52) U.S. Cl.
CPC ....... *G05B 19/406* (2013.01); *G05B 19/4183* (2013.01); *G05B 19/4185* (2013.01); *G08B 21/187* (2013.01)

(58) Field of Classification Search
CPC .. G05B 19/0428; G05B 19/4184; G05B 9/03; G05B 2219/45031; G05B 23/0272;

(Continued)

(56) References Cited

U.S. PATENT DOCUMENTS 8,369,980 B2 * 2/2013 Buhler ..................... B23H 7/02
219/69.11
9,206,309 B2 * 12/2015 Appleby .................. B22C 9/04
(Continued)

FOREIGN PATENT DOCUMENTS

DE 10 2005 008 517 9/2005
DE 10 2009 051 446 5/2011
(Continued)

OTHER PUBLICATIONS

Notification of Reasons for Refusal dated Aug. 28, 2018 in corresponding Japanese Application No. 2017-019365.
(Continued)

*Primary Examiner* — Mark S Blouin
(74) *Attorney, Agent, or Firm* — Wenderoth, Lind & Ponack, L.L.P.

(57) ABSTRACT

To provide a monitoring device, a machine tool, and a monitoring system capable of collecting data efficiently required for examining an alarm. A monitoring device is connected to multiple machine tools through a network. The monitoring device comprises: a monitoring unit that monitors the occurrence of an alarm in the machine tools; an acquisition unit that acquires a set of measurement target data items responsive to an alarm from a database on the occurrence of the alarm; and a collection unit that sets the set of measurement target data items in the multiple machine tools, and collects data measured by following the setting.

3 Claims, 3 Drawing Sheets

(58) Field of Classification Search
CPC ...... G05B 9/02; G05B 15/02; G05B 19/4183;
G05B 2219/24195
USPC ........................................................ 340/3.43
See application file for complete search history.

(56) References Cited

U.S. PATENT DOCUMENTS 10,024,758 B2 * 7/2018 Kamiya ................ G01M 13/00
10,139,311 B2 * 11/2018 Liao .................... B23Q 17/0995

FOREIGN PATENT DOCUMENTS

| JP | 2003-280707 | 10/2003 |
| JP | 2007-034547 | 2/2007 |
| JP | 2009-282822 | 12/2009 |
| WO | 2016/132479 | 8/2016 |

OTHER PUBLICATIONS

Notification of Reasons for Refusal dated Jan. 15, 2019 in corresponding Japanese Application No. 2017-019365.
Office Action dated Aug. 30, 2019 in German Application No. 102018201379.9.

* cited by examiner

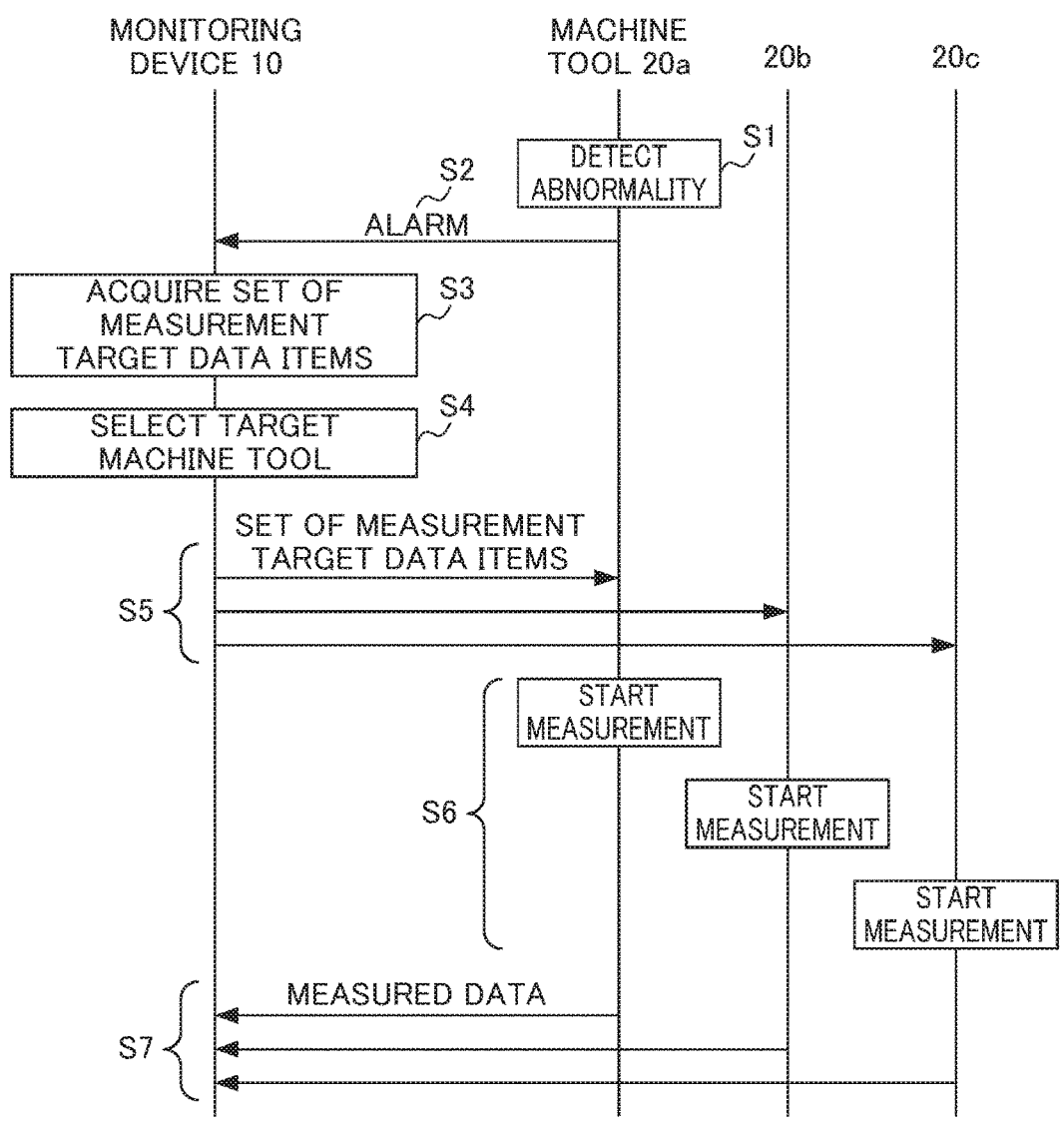

MONITORING DEVICE, MACHINE TOOL, AND MONITORING SYSTEM

This application is based on and claims the benefit of priority from Japanese Patent Application No. 2017-019365, filed on 6 Feb. 2017, the content of which is incorporated herein by reference.

BACKGROUND OF THE INVENTION

Field of the Invention

The present invention relates to a monitoring device, a machine tool and a monitoring system for collecting data on the occurrence of an alarm in the machine tool, Related Art Conventionally, a machine tool has the function of detecting a sensor value different from a value at the time of normal operation and outputting an alarm, thereby notifying an operator, an officer, etc. of the occurrence of a state that might lead to trouble. In many cases, multiple machine tools of the same type are operating in a factory. It is highly likely that, if these machine tools are operating in similar situations, same trouble will occur in these machine tools. Patent document 1 suggests a system of sharing information between machine tools of the same type and using the shared information for one of the machine tools.

Patent Document 1: Japanese Unexamined Patent Application, Publication No, 2009-282822

SUMMARY OF THE INVENTION

If an alarm occurs in a machine tool, various types of measured data are needed to find out a cause for the alarm. Meanwhile, required measurement target data items extend over a wide range according to an alarm type. Hence, to respond to every alarm, a massive amount of measured data is required to be collected all the time, leading to high processing load. In particular, managing machine tools in a centralized manner by using a monitoring device in a network causes high traffic load. This has imposed limitation on the types of measured data to be collected from machine tools, making it difficult to collect data sufficiently on the occurrence of an alarm.

The present invention is intended to provide a monitoring device, a machine tool, and a monitoring system capable of collecting data efficiently required for examining an alarm.

(1) A monitoring device according to the present invention (monitoring device 10 described later, for example) is connected to multiple machine tools (machine tools 20 described later, for example) through a network. The monitoring device comprises: a monitoring unit (monitoring unit 11 described later, for example) that monitors the occurrence of an alarm in the machine tools; an acquisition unit (acquisition unit 13 described later, for example) that acquires a set of measurement target data items responsive to an alarm from a database (database 16 described later, for example) on the occurrence of the alarm; and a collection unit (collection unit 15 described later, for example) that sets the set of measurement target data items in the multiple machine tools, and collects data measured by following the setting.

(2) The monitoring device described in (1) may comprise: a counting unit (counting unit 12 described later, for example) that counts the number of times each alarm occurred; and a selection unit (selection unit 14 described later, for example) that selects a machine tool as a measurement target in which the set of measurement target data items is to be set based on a state of occurrence of the same alarm determined using a result of the counting by the counting unit.

(3) In the monitoring device described in (2), the selection unit may select machine tools of the same type classified in advance.

(4) in the monitoring device described in (3), if an alarm occurred at a frequency less than a predetermined frequency, the selection unit may select all the machine tools of the same type.

(5) In the monitoring device described in (3), if an alarm occurs only in one group out of the machine tools of the same type, the selection unit may Select machine tools belonging to the one group.

(6) A machine tool according to the present invention (machine tool 20 described later, for example) includes multiple machine tools connected to a monitoring device (monitoring device 10 described later, for example) through a network. The machine tool comprises: a notification unit. (notification unit 21 described later, for example) that notifies the monitoring device of an alarm having occurred in the machine tool; a setting unit (setting unit 22 described later, for example) that receives a set of set measurement target data items from the monitoring device responsive to the alarm notified to the monitoring device, and makes setting about the set of measurement target data items; and a transmission unit (transmission unit 23 described later, for example) that transmits data measured by following the setting about the set of measurement target data items to the monitoring device.

(7) A monitoring system according to the present invention (monitoring system 1 described later, for example) comprises a monitoring device (monitoring device 10 described later, for example) and multiple machine tools (machine tools 20 described later, for example) connected to the monitoring device through a network. The monitoring device comprises: a monitoring unit (monitoring unit 11 described later, for example) that monitors the occurrence of an alarm in the machine tools; an acquisition unit (acquisition unit 13 described later, for example) that acquires a set of measurement target data items responsive to an alarm from a database (database 16 described later, for example) on the occurrence of the alarm; and a collection unit (collection unit 15 described later, for example) that sets the set of measurement target data items in the multiple machine tools, and collects data measured by following the setting. The machine tools each comprise: a notification unit (notification unit 21 described later, for example) that notifies the monitoring device of an alarm having occurred in the machine tool; a setting unit (setting unit. 22 described later, for example) that receives the set of measurement target data items from the monitoring device, and makes setting about, the set of measurement target data items; and a transmission unit (transmission unit 23 described later, for example) that transmits data measured by following the setting about the set of measurement target data items to the monitoring device.

According to the present invention, data required for examining an alarm having occurred in a machine tool can be collected efficiently.

BRIEF DESCRIPTION OF THE DRAWINGS

FIG. 4 is a sequence diagram showing a monitoring method according to the embodiment.

DETAILED DESCRIPTION OF THE INVENTION

Figure 1:
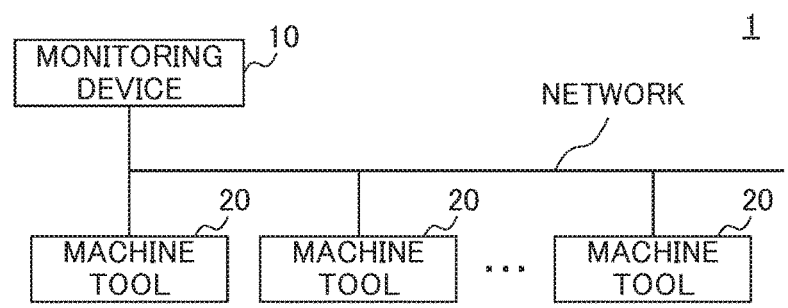
FIG. 1 is a block diagram showing the configuration of a monitoring system according to an embodiment.

An example of an embodiment of the present invention will be described below. FIG. 1 is a block diagram showing the configuration of a monitoring system 1 according to the embodiment. The monitoring system 1 includes a monitoring device 10, and multiple machine tools 20 connected to the monitoring device 10 through a network.

The monitoring device 10 is an information processor (computer) such as a server or a PC, for example. The monitoring device 10 monitors the occurrence of an alarm in the multiple machine tools 20, receives various types of measured data from each machine tool 20, and manages the received measured data. The machine tool 20 notifies the monitoring device 10 of the occurrence of an alarm in the machine tool 20 itself based on a sensor output, for example. Further, the machine tool 20 transmits various types of measured data set as measurement targets to the monitoring device 10. The machine tool 20 includes a tool for machining under numerical control, a robot to operate in a factory, etc.

Figure 2:
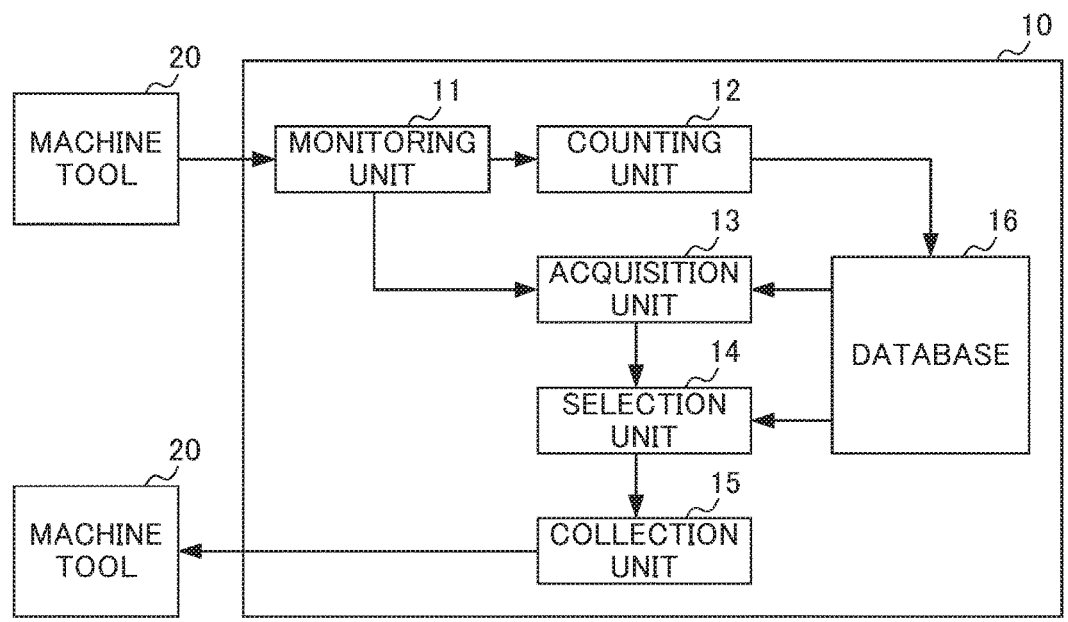
FIG. 2 is a block diagram showing the functional configuration of a monitoring device according to the embodiment.

FIG. 2 is a block diagram snowing the functional configuration of the monitoring device 10 forming the monitoring system 1 according to the embodiment. The monitoring device 10 includes a monitoring unit 11, a counting unit 12, an acquisition unit 13, a selection unit 14, a collection unit 15, and a database 16.

The monitoring unit 11 monitors the occurrence of an alarm in the machine tool 20. More specifically, the monitoring unit 11 detects the occurrence of an alarm by referring to alarm information notified from the machine tool 20 or receiving notification data transmitted from the machine tool 20.

The counting unit 12 counts the number of times each alarm occurred in the past and determines a state of occurrence of each alarm. A state of occurrence of an alarm is statistical information containing the frequency of occurrence of the alarm, a bias in the machine tool 20 where the alarm occurred, etc. A result of the counting and the determined state of occurrence of the alarm are stored into the database 16.

If the occurrence of an alarm in any of the multiple machine tools 20 as monitoring targets is detected, the acquisition unit 13 acquires a set of measurement target data items responsive to the detected alarm from the database 16.

The selection unit 14 selects a machine tool 20 as a measurement target in which the set of measurement target data items is to be set based on the state of occurrence of the same alarm determined using the result of the counting by the counting unit 12. More specifically, the selection unit 14 selects machine tools 20 of the same type classified in advance. For example, machine tools 20 to be selected are models of the same specification, or models to operate in the same way or in similar ways. Further, machine tools 20 in similar environments may be selected such as those belonging to the same power supply system or to the same region, for example.

If an alarm occurred in the past at a frequency less than a predetermined frequency, the selection unit 14 selects all the machine tools 20 of the same type classified in advance. If an alarm X occurs in one machine tool 20 at a frequency of 0.01 times per month, for example, collection of data from N machine tools 20 is started. By doing so, the monitoring device 10 becomes capable of collecting N times greater amount of information (amount collected per month is calculated by multiplying 0.01 by N) on the occurrence of the alarm X.

If an alarm occurs only in one group and the alarm does not occur in a different group out of the machine tools 20 classified in the same type, the selection unit 14 selects only machine tools 20 belonging to the one group in which the alarm occurs. If machine tools 20 having similar configurations manufactured by multiple manufactures are being used for the same machining, for example, these machine tools 20 manufactured by these manufactures are classified in the same type. If an alarm Y occurs only in machine tools 20 manufactured by a manufacture A out of these machine tools 20, the selection unit 14 selects the machine tools 20 manufactured by the manufacture A as a group. As another example, if multiple power supply systems are prepared in a factory and an alarm Z occurs only in one group of machine tools 20 connected to a particular power supply system a out of the machine tools 20 of the same type, the selection unit 14 selects the group connected to the power supply system a. In such cases, machine tools 20 in a group not selected are not treated as measurement targets responsive to the detected alarm. Thus, if a different alarm newly occurs, for example, these machine tools 20 become selectable in response to this new alarm.

If an alarm occurs in an unspecified machine tool 20, machine tools 20 cannot be narrowed down into a group. Thus, in this case, the selection unit 14 selects all the machine tools 20 classified into the same type.

The collection unit 15 sets the set of measurement target data items in the multiple machine tools 20 selected by the selection unit 14, and collects data (waveform data) measured by the machine tools 20 by following this setting. The measured data may be collected in a properly set period. A predetermined period may be set in advance. Alternatively, a condition for a period may be established. For example, measured data is to be collected until a next alarm occurs or until a new setting is made.

To respond to multiple different alarms simultaneously and one machine tool 20 is selected as a measurement target, limitation is imposed on setting multiple sets of measurement target data items. Thus, the alarms may be given priority levels in advance. In this case, the collection unit 15 suspends response to an alarm of a low priority level until collection of data about an alarm of a high priority level is finished. At this time, if a total of sets of measurement target data items responsive to the multiple alarms is within the limitation, the collection unit 15 may set the one machine tool 20 so as to collect data corresponding to the measurement target data items responsive to these alarms simultaneously from the one machine tool 20.

The database 16 stores a set of measurement target data items responsive to each alarm that might occur in the machine tools 20 and required for finding out a cause for the alarm, for example. The database 16 is described as a unit provided in the monitoring device 10. Alternatively, the database 16 may be provided in an external device.

The database 16 contains a set of speed deviation, positional deviation, torque command, and current feedback associated with an "over current alarm," for example. If only current feedback is found to be increased while speed deviation, positional deviation, and torque command are found not to be increased as a result of collection of measured data corresponding to these data items, it can be determined that there is a high likelihood of a short. In another case, if all of speed deviation, positional deviation, torque command, and current feedback are found to be large, it can be determined that there is a problem in a machining condition.

As another example, the database 16 contains a set of input power supply voltage of a common power supply, DC link voltage, speed feedback of a motor, and power consumption of the motor associated with an "alarm about amplifier DC link voltage reduction." If only DC link voltage is found to be reduced while input power supply voltage is found not to be reduced as a result of collection of measured data corresponding to these data items, it can be determined that DC link connection or the amplifier is defective. In another case, if input power supply voltage and DC link voltage are found to be reduced during acceleration of the motor, specifically, while power consumption is large, it can be determined that there is shortage in the power supply capacity.

Figure 3:
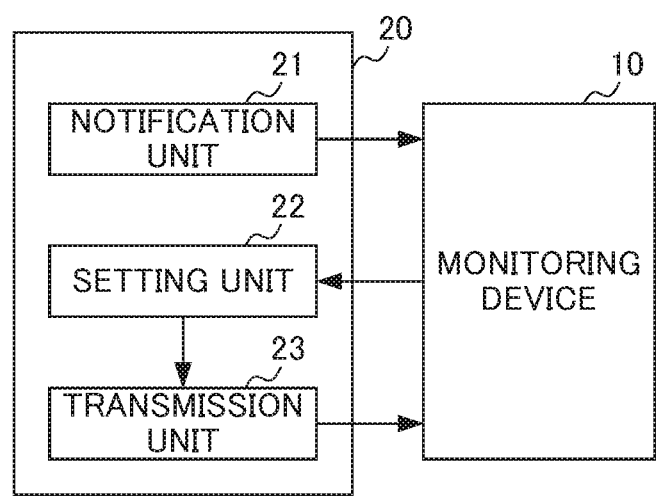
FIG. 3 is a block diagram showing the functional configuration of a machine tool according to the embodiment.

FIG. 3 is a block diagram showing the functional configuration of the machine tool 20 forming the monitoring system 1 according to the embodiment. The machine tool 20 includes a notification unit 21, a setting unit 22, and a transmission unit 23.

The notification unit 21 notifies the monitoring device 10 of an alarm having occurred in the machine tool 20 to which the notification unit 21 belongs. More specifically, the notification unit 21 may maintain alarm information in the machine tool 20 in such a manner that the alarm information can be referred to from the outside, thereby allowing the monitoring device 10 to read the maintained alarm information. Alternatively, the notification unit 21 may transmit the alarm information actively to the monitoring device 10.

The setting unit 22 receives a set of measurement target data items from the monitoring device 10 responsive to an alarm notified to the monitoring device 10 from any one of the machine tools 20, and makes setting so as to start measurement of data corresponding to the received data items.

The transmission unit 23 transmits the data measured by following the setting made by the setting unit 22 to the monitoring device 10.

FIG. 4 is a sequence diagram showing a monitoring method implemented by the monitoring system 1 according to the embodiment. In step S1, a machine tool 20a detects an abnormal state occurring in the machine tool 20a based on predetermined sensor information. In step S2, the machine tool 20a notifies the monitoring device 10 of the detected abnormal state as an alarm.

In step S3, the monitoring device 10 acquires a set of measurement target data items from the database 16 responsive to the alarm notified from the machine tool 20a. In step S4, based on a state of occurrence of the alarm in the past, the monitoring device 10 selects machine tools 20 (20a, 20b, and 20c, for example) to collect data corresponding to the measurement target data items.

In step S5, the monitoring device 10 notifies the selected machine tools 20 (in this example, 20a, 20b, and 20c described above) of the acquired set of measurement target data items, and makes the selected machine tools 20 set these data items as measurement targets. In step S6, the machine tools 20 as measurement targets set the notified set of measurement target data items, and start data measurement. In step S7, the machine tools 20 as measurement targets transmit the measured data to the monitoring device 10.

In the embodiment, in response to an alarm having occurred in one machine tool 20a, the monitoring system 1 sets a set of measurement target data items required for finding out a cause for the alarm in multiple machine tools 20 (20a, 20b and 20c) of the same type in which the same alarm might occur. For reduction in processing load on the machine tool 20, reduction in the amount of traffic through a network, etc., the number of data types measurable in the machine tool 20 is limited, particularly for data of a short sampling cycle. In this case, such data is not collected in a normal state or only measured data of a limited type is collected. Hence, it is highly likely that the machine tool 20 does not contain appropriate data to be collected on the occurrence of an alarm. The monitoring device 10 can collect data corresponding to a set measurement target data item at the appropriate time in response to the same alarm highly likely to occur in the future, and find out a cause for the alarm efficiently.

The monitoring device 10 counts the number of times each alarm occurred. Based on a state of occurrence of the alarm in the past determined using a result of the counting, the monitoring device 10 can select an appropriate machine tool 20 and set a set of measurement target data items in the selected machine tool 20. In this way, the monitoring system 1 is allowed to collect required measured data efficiently while reducing processing load and a traffic amount.

If machine tools 20 of the same type operate in the same way in the same environment, it is highly likely that the same alarm will occur in these machine tools 20. Thus, by selecting these machine tools 20 of the same type, the monitoring device 10 is allowed to collect measured data with high probability on the occurrence of this alarm. In particular, by determining all the machine tools 20 of the same type to be measurement targets in response to an alarm of a low frequency of occurrence, the monitoring device 10 is allowed to collect data with higher probability. As a result, a cause for the occurrence of the alarm can be found out efficiently.

If an alarm occurs only in one group out of the machine tools 20 of the same type, the monitoring device 10 selects machine tools 20 belonging to this group. By doing so, processing load on data measurement can be reduced and the amount of traffic through a network can be reduced. The monitoring device 10 can also collect measured data responsive to a different alarm from an unselected machine tool 20, so that multiple alarms can be handled efficiently.

The present invention is not limited to the above-described embodiment. The effects described in the embodiment are merely a list of most preferred effects resulting from the present invention. Effects achieved by the present invention are not limited to those described in the embodiment.

The monitoring method implemented by the monitoring system 1 is realized by software. To realize the monitoring method by software, programs constituting this software are installed on a computer. These programs may be recorded in a removable medium and distributed to a user. Alternatively, these programs may be distributed by being downloaded onto a computer of the user through a network.

EXPLANATION OF REFERENCE NUMERALS

1 Monitoring system
10 Monitoring device

11 Monitoring unit
12 Counting unit
13 Acquisition unit
14 Selection unit
15 Collection unit
16 Database
20 Machine tool
21 Notification unit
22 Setting unit
23 Transmission unit

What is claimed is:

1. A monitoring device connected to multiple machine tools through a network, the monitoring device comprising:
   a monitoring unit that monitors the occurrence of an alarm in the machine tools;
   a counting unit that counts the number of time each alarm occurred;
   an acquisition unit that acquires a set of measurement target data items responsive to an alarm from a database on the occurrence of the alarm;
   a selection unit that selects a machine tool as a measurement target in which the set of measurement target data items is to be set based on a state of occurrence of the same alarm determined using a result of the counting by the counting unit; and
   a collection unit that sets the set of measurement target data items in the machine tool selected by the selection unit, and collects data measured by following the setting,
   wherein, if an alarm occurred at a frequency less than a predetermined frequency, the selection unit selects all the machine tools of the same type classified in advance.

2. The monitoring device according to claim 1, wherein, if an alarm occurs only in any of the machine tools belonging to one group and the alarm does not occur in machine tools which do not belong to the one group out of the machine tools of the same type, the selection unit selects only the machine tools belonging to the one group.

3. A monitoring system comprising a monitoring device and multiple machine tools connected to the monitoring device through a network,
   the monitoring device comprising:
      a monitoring unit that monitors the occurrence of an alarm in the machine tools;
         a counting unit that counts the number of times each alarm occurred;
      an acquisition unit that acquires a set of measurement target data items responsive to an alarm from a database on the occurrence of the alarm;
      a selection unit that selects a machine tool as a measurement target in which the set of measurement target data items is to be set based on a state of occurrence of the same alarm determined using a result of the counting by the counting unit and
      a collection unit that sets the set of measurement target data items in the machine tool selected by the selection unit, and collects data measured by following the setting,
   wherein, if an alarm occurred at a frequency less than a predetermined frequency, the selection unit selects all the machine tools of the same type classified in advance,
   the machine tools each comprising:
   a notification unit that notifies the monitoring device of an alarm having occurred in the machine tool;
   a setting unit that receives the set of measurement target data items from the monitoring device, and makes setting about the set of measurement target data items; and
   a transmission unit that transmits data measured by following the setting about the set of measurement target data items to the monitoring device.

* * * * *